United States Patent [19]
Fujiwara et al.

[11] Patent Number: 5,609,810
[45] Date of Patent: Mar. 11, 1997

[54] METHOD OF MOLDING CASES USED IN INFORMATION DETECTION HOLE SYSTEM AND APPARATUS THEREFOR

[75] Inventors: Morio Fujiwara; Takashi Ohgiyama, both of Kanagawa, Japan

[73] Assignee: Fuji Photo Film Co., Ltd., Kanagawa, Japan

[21] Appl. No.: 377,092

[22] Filed: Jan. 23, 1995

[30] Foreign Application Priority Data

Jan. 31, 1994 [JP] Japan .................................. 6-025929

[51] Int. Cl.⁶ .................................................. B29C 33/30
[52] U.S. Cl. ........................ 264/219; 264/328.1; 249/102; 425/192 R; 425/195; 425/468
[58] Field of Search ................................ 264/219, 328.1; 249/63, 64, 102, 103, 104; 425/190, 192 R, 195, 468, 577

[56] References Cited

U.S. PATENT DOCUMENTS

| | | | |
|---|---|---|---|
| 2,881,478 | 4/1959 | Gruenberg | 425/195 |
| 3,251,460 | 5/1966 | Edmonds | 425/195 |
| 3,431,601 | 3/1969 | Lipscomb | 425/195 |
| 4,073,463 | 2/1978 | Bell | 249/102 |
| 4,384,702 | 5/1983 | Boskovic | 249/103 |
| 4,741,683 | 5/1988 | Hilke et al. | 425/195 |
| 5,167,898 | 12/1992 | Luther | 264/328.1 |

*Primary Examiner*—Jill L. Heitbrink
*Attorney, Agent, or Firm*—Sughrue, Mion, Zinn, Macpeak & Seas

[57] ABSTRACT

A method and an apparatus for forming a plurality of types of cases which differ in the position of the identification holes, or the like, is provided. The invention can curb equipment costs and help reduce production costs as a result of minimizing the types of molds to be prepared by making shared used of the molds, and can greatly reduce the work required to change the type of case to be molded. The insertion/removal, fixing, or positioning adjustment of the bush pin which forms the identification hole by projecting into the interior of the cavity of the mold forming the case is conducted by a fixing member which passes through the bush pin and screws into the mold, and which can be manipulated from the parting face side of the mold when the cavity is opened.

7 Claims, 5 Drawing Sheets

METHOD OF MOLDING CASES USED IN INFORMATION DETECTION HOLE SYSTEM AND APPARATUS THEREFOR

BACKGROUND OF THE INVENTION

1. Field of the Invention

The present invention relates to a method and apparatus for molding a case used in an information detection hole system, in which the presence of an identification hole formed in the case, the position of the identification hole, and the form of the identification hole are detected in order to obtain specified information relating to the case.

2. Related Art

An information detection hole system refers, for example, to a system in which specified information such as the storage capacity and data write feasibility of a magnetic disk housed in a microfloppy disk case (disk cartridge) can be detected according to the presence of the identification hole provided at a prescribed position on the case. The microfloppy disk is configured such that a thin magnetic disk is rotatably stored inside a thin rectangular case. This case is comprised of a pair of shallow box-like case halves which are synthetic resin molds and. Heretofore, these microfloppy disk cases have been developed with common external dimensions, and classified according to storage capacity into the 1MB (megabyte) type, 2MB type, 4MB type, etc. The respective identification holes are provided at prescribed positions on the cases for the purposes of identifying the respective types (storage capacities), and for the purposes of permitting/inhibiting data writing onto the magnetic disks (to prevent mistaken erasures). The identification hole for permitting/inhibiting data writing is configured to be capable of being opened and closed so as to permit the changing of the state of permitting/inhibiting data writing at appropriate times.

Accordingly, in the case where this microfloppy disk case is manufactured, it is necessary to change the setting of the cavity of the mold of the molding machine according to the-type of storage capacity, so that the respective identification holes for type identification and for data writing permission/inhibition are formed in the prescribed positions. In this case, when one adopts a case molding method where a dedicated mold is prepared for each type, and a dedicated mold is set in the molding machine corresponding to the type to be manufactured, one must successively repeat troublesome operations involving the removal of the mold from the molding machine, the disassembly/assembly of the mold, and the attachment of the mold to the molding machine whenever the type to be manufactured is changed, and the rate of operation markedly drops. Furthermore, by increasing the number of the types of mold to be prepared, there is a problem that equipment costs increase, leading to a rise in production costs.

Therefore, as disclosed in Japanese Utility Model Unexamined Publication No. Hei-2-146013 and Japanese Patent Unexamined Publication No. Hei-5-212752, a forming method has been proposed wherein the mold product part defining the cavity is made common to the respective type, and the bush element which projects into the interior of the cavity for the purposes of forming the identification holes is removably attached. Only the bush elements need be prepared according to the respective storage capacity types, and the bush elements are replaced when changing the type of the case to be produced. Thus, by means of a case forming method which enables matching with each type by replacement of the bush elements alone, it is necessary to prepare only one kind of mold, so that it is possible to mitigate equipment costs and seek the reduction of production costs.

In the case forming method disclosed in the aforementioned Japanese Utility Model Unexamined Publication No. Hei-2-146013, the bush elements designed to form the identification holes are removably attached to the core mold. In this case, since a configuration is adopted where the bush elements are attached or removed from the mold attachment face of the core mold (the face at the opposite side to the cavity side), when replacing the bush elements for the purposes of changing the type to be produced, it is necessary to expose the mold attachment face of the core mold by removing the core mold from the core receiving plate of the molding machine. Thus, in the final analysis, the aforementioned proposal could not resolve the conventional problem. It is still necessary to successively repeat troublesome operations involving the removal of the mold from the molding machine, the disassembly/assembly of the mold, and the attachment of the mold to the molding machine whenever the type to be manufactured is changed; thus, the rate of operation is still low.

On the other hand, in the case of Japanese Patent Unexamined Publication Hei-5-212752, the bush elements designed to form the identification holes are attached to a cavity mold which is a fixed mold. The bush elements are attached to the cavity mold in such a way that they can be freely slipped on and off from the back side of the cavity mold, and are fixed in place by the pressure of pressers which are provided in the fixed side receiving plate supporting the cavity mold. Furthermore, the fixed side receiving plate is constituted by two receiving plate members. A first fixed side receiving plate member is positioned on the cavity mold side and which has through holes into which the pressers are inserted. A second fixed side receiving plate member is positioned on the fixed block side of the molding machine and which prevents the removal of the pressers that are inserted into the first fixed side receiving plate member. These two fixed side receiving plate members are made capable of mutual separation by a bolt which is removably attached from the parting face between the cavity mold and the core mold.

That is, in the case of Japanese Patent Unexamined Publication No. Hei-5-212752, by opening the cavity mold and the core mold and by removing from the parting face side the bolt which fixes the first and second fixed side receiving plate members, it becomes possible to replace the bush elements while the cavity mold itself is attached to the molding machine, and compared to the case of the aforementioned Japanese Utility Model Unexamined Publication No. Hei-2-146013, the work operations at the time of bush element replacement are greatly reduced.

However, in the case of this Japanese Patent Unexamined Publication No. Hei-5-212752, the use of two fixed side receiving plate members leads to the complication of the configuration. There is a problem that it is necessary to conduct the labor of separating the two fixed side receiving plate members in order to replace the bush elements, and that it becomes proportionately difficult to improve the rate of operation.

In order to minimize the labor involved in the replacement of the bush elements, a configuration is also being researched wherein attachment pieces which project along the parting face between the cavity mold and the core mold are provided in the respective bush elements that form the identification holes, and wherein these attachment pieces are directly screwed on the back of one of the metal molds outside the cavity region.

In this type of configuration, on the back of the mold to which the attachment pieces are to be fixed, grooves are formed into which the attachment pieces are fitted. Slight differences in grade remain along the contour into which the attachment pieces fit, and a problem has been pointed out that this forms a mark on the rear of the molded case-half which damages the external appearance of the case.

SUMMARY OF THE INVENTION

Thus, an object of the present invention is to resolve the aforementioned problems, and to provide a superior method and apparatus for molding the cases used in an information detection hole system which, for example, when a plurality of types of cases, in which the position of the identification holes differs, are molded, mitigates equipment costs and helps reduce production costs by reducing to the minimum the types of molds to be prepared as a result of making shared used on the molds. A second object of the present invention is to provide a case molding method and apparatus which greatly decrease the work required to change the type of case to be molded and can simply improve the rate of operation. A third object of the present invention is to provide a case molding method and apparatus which do not produce the inconvenience of forming meaningless marks that damage the appearance of the surface of the molded cases.

The above and other objects of the present invention can be achieved by a method of molding a case used in an information detection hole system in which the presence of an identification hole formed in the case, the position of said identification hole, and the form of said identification hole are detectable for indicating specific information relating to said case, comprising the steps of: providing a removable bush pin which forms said identification hole by projecting into a cavity of a mold which forms said case; fixing said bush pin by providing a fixing member which passes through said bush pin and inserts into said mold and which can be manipulated from a parting face side when the cavity of said mold is open; and molding said case, wherein changing said specific information between molding operations is conducted by one of replacing said bush pin and altering its attachment position by manipulating said fixing member.

The above method preferably further comprises the steps of: providing a bush fitting hole, in the mold to which said bush pin is attached, into which said bush pin is inserted and which passes from the cavity side to the side opposite to the cavity; and inserting an insertion body into said bush fitting hole from a side opposite said cavity side, for regulating the depth of penetration of said bush pin into said bush fitting hole.

The above and other objects of the present invention can be achieved by an apparatus for molding a case used in an information detection hole system in which the presence of an identification hole formed in the case, the position of said identification hole, and the form of said identification hole are detectable for indicating specific information relating to said case, comprising: a core mold, attached to one of a movable attachment plate and a fixed attachment plate; a cavity mold, attached to the other of said movable attachment plate and said fixed attachment plate, said cavity mold being disposed facing said core mold; a bush fitting hole, disposed in one of said core mold and said cavity mold; and a bush pin, removably disposed in said bush fitting hole, wherein said cavity mold and said core mold form a cavity in a closed-mold configuration.

In the above molding apparatus, the bush pin is alternatively capable of projecting into the cavity or being flush with a top of said bush fitting hole, thereby not projecting into the cavity.

In the above molding apparatus, the bush fitting hole may pass through an entire width of said one of said core mold and cavity mold, and the apparatus may further comprise an insertion body, adjustably insertable into said bush fitting hole from a side opposite a side into which said bush pin is inserted, for regulating the depth of penetration of said bush pin in said bush fitting hole.

In the above apparatus, it is preferred that the bush pin be made softer than the mold, to prevent abrasion of the mold from repetitive mold processing.

DETAILED DESCRIPTION OF THE PREFERRED EMBODIMENTS

Below, the present invention is explained with reference to drawings.

FIG. 1 to FIG. 4 show an embodiment of the method of molding cases used in information detection hole systems according to the present invention, and show an example where a microfloppy disk case (disk cartridge) is molded.

The microfloppy disk has a configuration where a magnetic disk of thin discoid shape is rotatably housed inside a thin rectangular case. As mentioned above, this microfloppy disk comes in a 1MB type, 2MB type, or 4MB type according to the storage capacity of the housed magnetic disk, and the position and number of the identification holes which are established to show the specified information differ according to each type.

Figure 5:
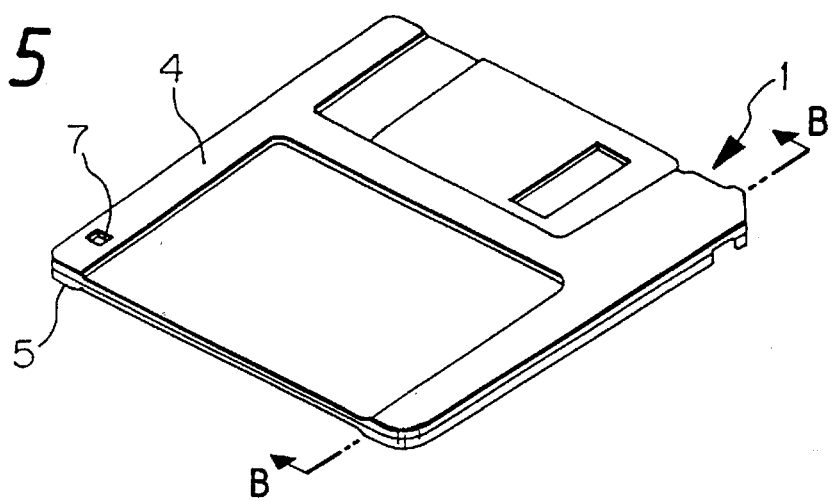
FIG. 5 A perspective view of microfloppy disk case of the 1MB type.
Figure 6:
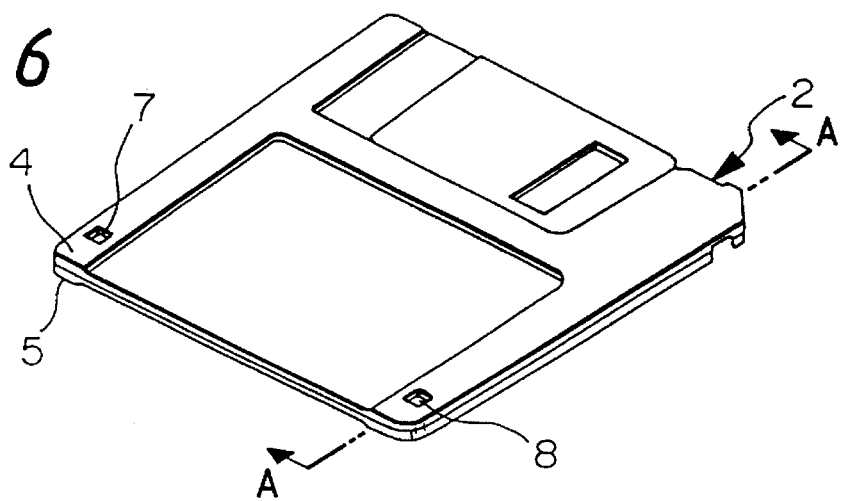
FIG. 6 A perspective view of a microfloppy disk case of the 2MB type.
Figure 7:
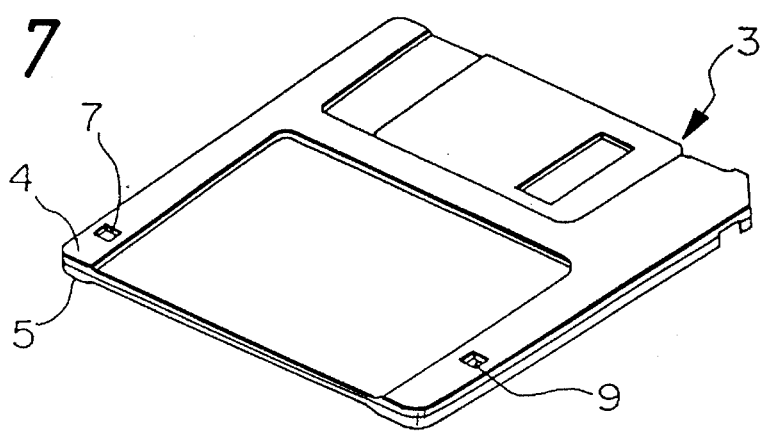
FIG. 7 A perspective view of a microfloppy disk case of the 4MB type.

FIG. 5 to FIG. 7 respectively show examples of the cases of the microfloppy disks. FIG. 5 shows a case 1 of the 1MB type, FIG. 6 shows a case 2 of the 2MB type, and FIG. 7 shows a case 3 of the 4MB type. These cases 1, 2, 3 respectively share common external dimensions, and each of them is composed by the joining of a pair of shallow box-like case halves 4 and 5 which are injection molded products of synthetic resin.

However, in case 1, for the identification holes showing specified information, there is formed only a mistaken erasure prevention hole 7 which enables/inhibits data writing. In case 2, for the identification holes showing specified information, a storage capacity identification hole 8 showing that this has 2MB storage capacity is formed in addition to the mistake erasure prevention hole 7. In case 3, for the identification holes showing specified information, a storage capacity identification hole 9 showing that this has 4MB storage capacity is formed in addition to the mistake erasure prevention hole 7. The storage capacity identification hole 8 and the storage capacity identification hole 9 are established in different positions.

Figure 1:
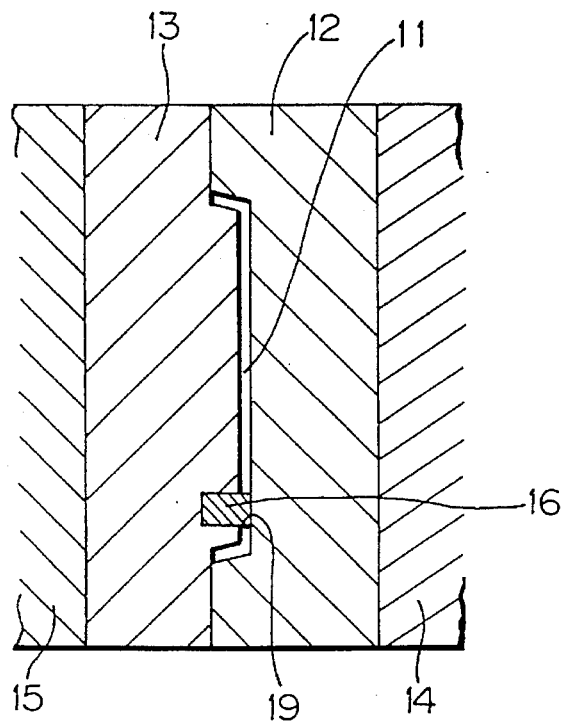
FIG. 1 A cross-sectional view of the mold in the state where the long pin is attached in an embodiment of the method of molding the cases used in information detection hole systems of the present invention.
Figure 2:
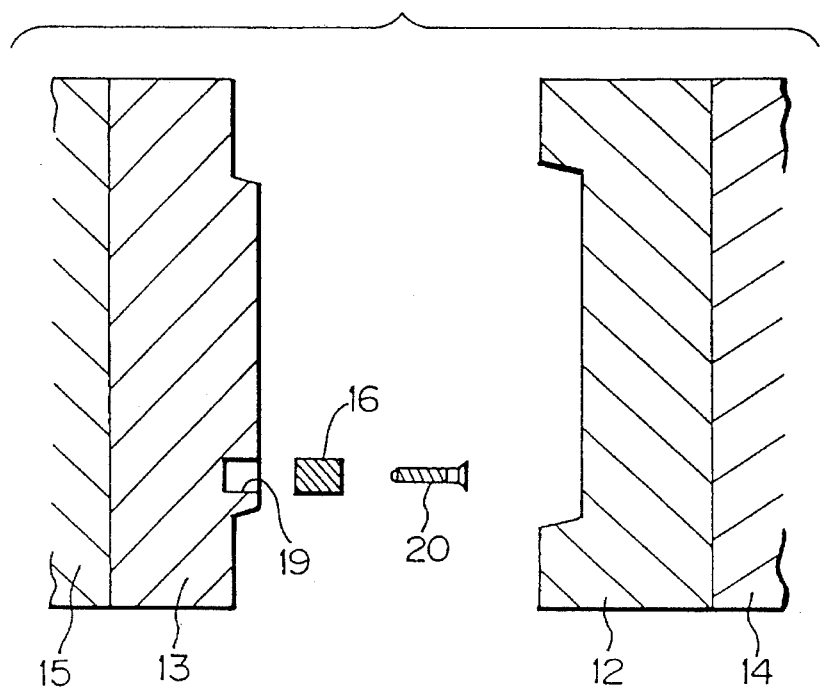
FIG. 2 An exploded view of the mold when the long bush pin is attached in the embodiment shown in FIG. 1.
Figure 3:
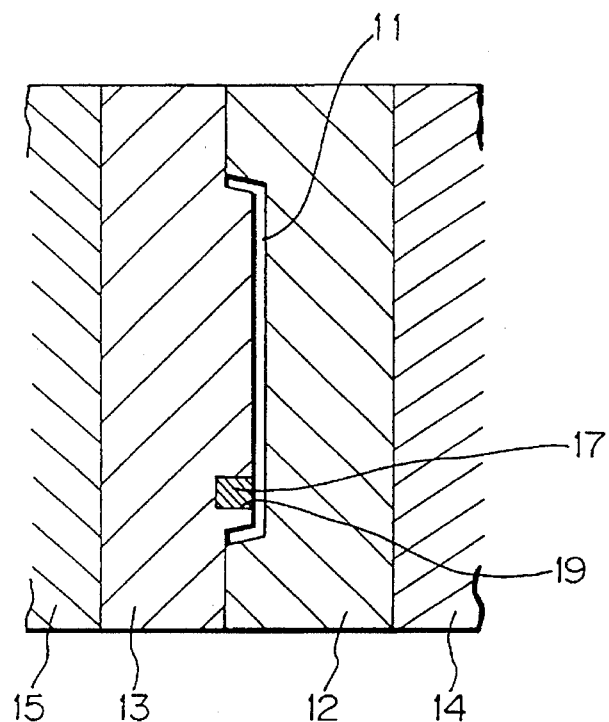
FIG. 3 A cross-sectional view of the mold in the state where the short bush pin is attached in the present invention.
Figure 4:
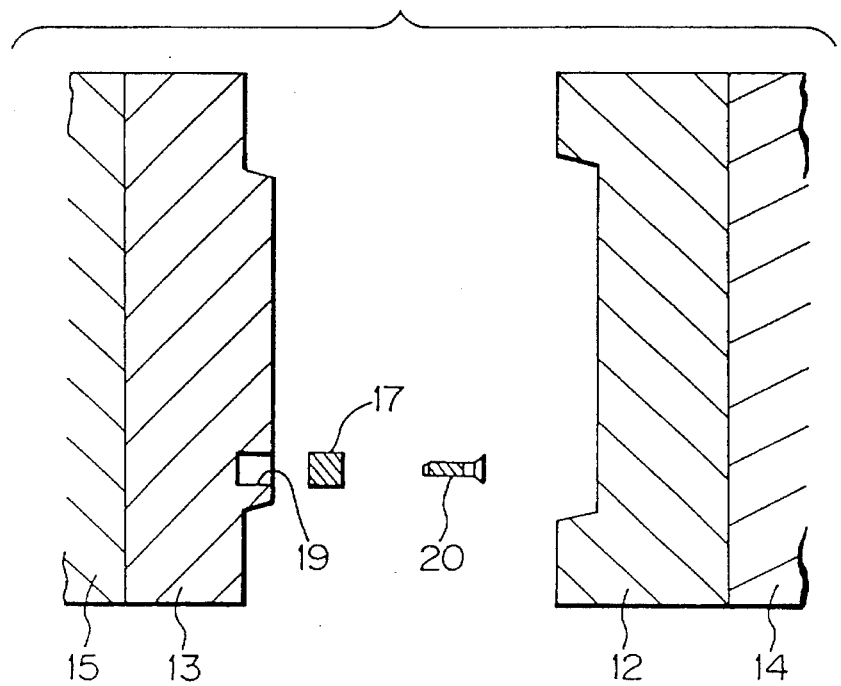
FIG. 4 An exploded view of the mold when the short bush pin is attached in FIG. 3.

The case molding method of this embodiment can be illustrated by showing examples of different types of microfloppy disks which are molded. FIG. 1 and FIG. 2 show an example where the storage capacity identification hole 8 of the 2MB type is formed, while FIG. 3 and FIG. 4 show an example where the 1MB type is formed. Moreover, FIG. 1 and FIG. 2 show a cross-section of the mold similar to the cross-section along line A—A in FIG. 6, while FIG. 3 and FIG. 4 show a cross-section of the mold similar to the cross-section along line B—B in FIG. 5.

As shown in FIG. 1 and FIG. 3, a cavity 11 designed to mold a case half 4 or a case half 5 (as illustrated in FIGS. 5–7) constituting the 1M type (case 1) or the 2MB type (case 2) is provided by a cavity mold 12 and a core mold 13.

The cavity mold 12 is a mold which forms the outside of a molded product, and is attached to a fixed platen of a molding machine via a mold attachment plate (fixed side attachment plate) 14. The core mold 13 forms a pair with the cavity mold 12, and is a mold which forms the inside of a molded product, the core mold 13 being attached to a movable platen of the molding machine via a mold attachment plate (moveable side attachment plate) 15.

The cavity mold 12 and core mold 13 are arranged opposite one another so as to be capable of being opened and closed by a mold clamp of the molding machine. The cavity 11 is defined in the mold-closed state.

In the case molding method of the present embodiment, a bush fitting hole 19, into which a bush pin 16 or 17 related to the formation of the identification hole is removably fitted, is formed in the core mold 13 at a predetermined depth from the cavity 11 side. As shown in FIG. 1, the bush pin 16 is a long pin whose length has been set so that it projects into the cavity 11 to the extent that its tip face contacts the surface of the cavity mold 12 in the mold-closed state, and it forms the storage capacity identification hole 8.

On the other hand, as shown in FIG. 3, the bush pin 17 is a short pin whose length has been set so that its tip face becomes level with the surface of the core mold 13 and does not project into the cavity 11, and it fills the bush fitting hole 19.

Accordingly, when mold-closing is conducted in a state where the bush pin 16 is attached to the core mold 13, and when cooling solidification is conducted after pressure packing the molten resin into the cavity 11 by an injection device, a case half (of the 2MB type) having a storage capacity identification hole 8 is formed. On the other hand, when mold-closing is conducted in a state where the bush pin 17 is attached to the core mold 13, and when cooling solidification is conducted after pressure packing the molten resin into the cavity 11 by an injection device, a case half (of the 1MB type) without a storage capacity identification hole 8 is formed.

That is, the bush pin 16 is attached to the core mold 13 when formation of an identification hole is required, and the bush pin 17 is attached to the core mold 13 when formation of an identification hole is not required.

As shown in FIG. 2 and FIG. 4, the bush pins 16 and 17 are respectively fixed to the core mold 13 by a fixing means 20 after being fit into the bush fitting hole 19 of the core mold 13. Here, the fixing means 20 is a screw member which passes through the center axis of the bush pin 16 or 17 from the cavity 11 side and screws into the core mold 13. When the cavity is opened, attachment or removal of the fixed bush pin 16 or 17 is possible by screwing/unscrewing the fixing means 20 from the parting face side.

The long bush pin 16 which is designed to form the storage capacity identification hole 8 is made from material (for example, beryllium copper) which is softer than the cavity mold 12 and the core mold 13 which together constitute the mold body.

According to the above configuration, if the cavity mold 12 and the core mold 13 are opened, the bush pins 16 and 17 can be attached to and removed from the core mold 13 simply by manipulating the fixing means 20, which can be manipulated from the parting face side between the cavity mold 12 and the core mold 13. Consequently, it becomes possible to replace the bush pins 16 and 17 without conducting troublesome operations involving the removal of the mold, disassembly/assembly of the mold, and its further attachment.

Thus, for example, when molding the cases of a plurality of different types of microfloppy disks having identification holes in different positions, one can simply prepare in advance only the bush pin corresponding to each type, and easily conduct appropriate replacement and use of the bush pins alone. By unifying the types of molds to be prepared by making common use of one mold, one can mitigate equipment costs, and help reduce production costs.

Since the operations required to change the type of case to be molded involve only the replacement of the bush pin by manipulation of the fixing means from the parting face side of the mold, one can greatly reduce the work required to change the types, and simply improve the rate of operation.

Furthermore, the fixing means 20 (which is designed to attach/remove the bush pins 16 and 17 to/from the core mold 13) is a member which passes through the center axis of the bush pin 16 or 17 and screws into the core mold 13. Since fixing means 20 is positioned inside the cavity 11, and is positioned within the range of formation of the identification hole 8, there is no infliction of meaningless marks on the surface of the molded case which could mar its external appearance.

Furthermore, since the bush pin 16 is made from material which is softer than the mold body, even if molding is repeated, one can prevent damage or abrasion of the mold of the counterpart side which is contacted by the bush pin 16. For example, if a configuration is adopted where a crimp is formed on the surface of a case to be molded by the mold, one can prevent the occurrence of the abrasion of the crimp, or the like.

Figure 8:
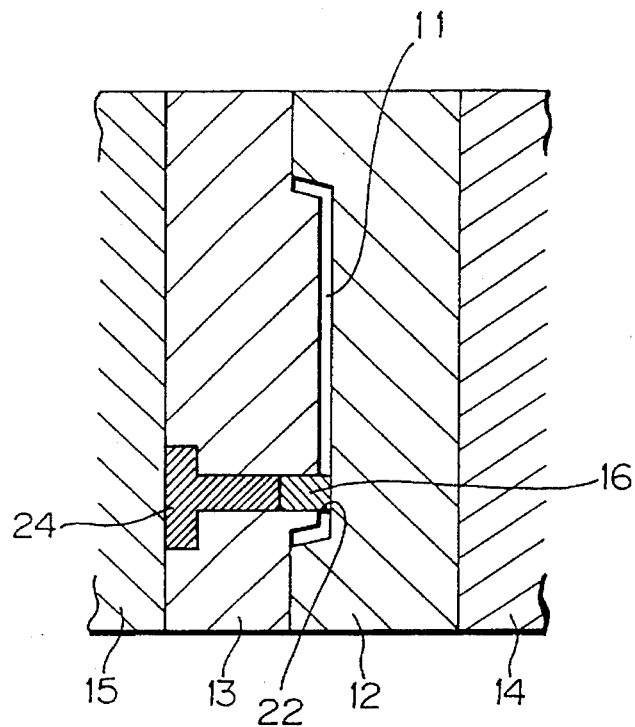
FIG. 8 A cross-sectional view of the mold in the state where the long bush pin is attached in another embodiment of the method of molding the cases used information detection hole systems of the present invention.
Figure 9:
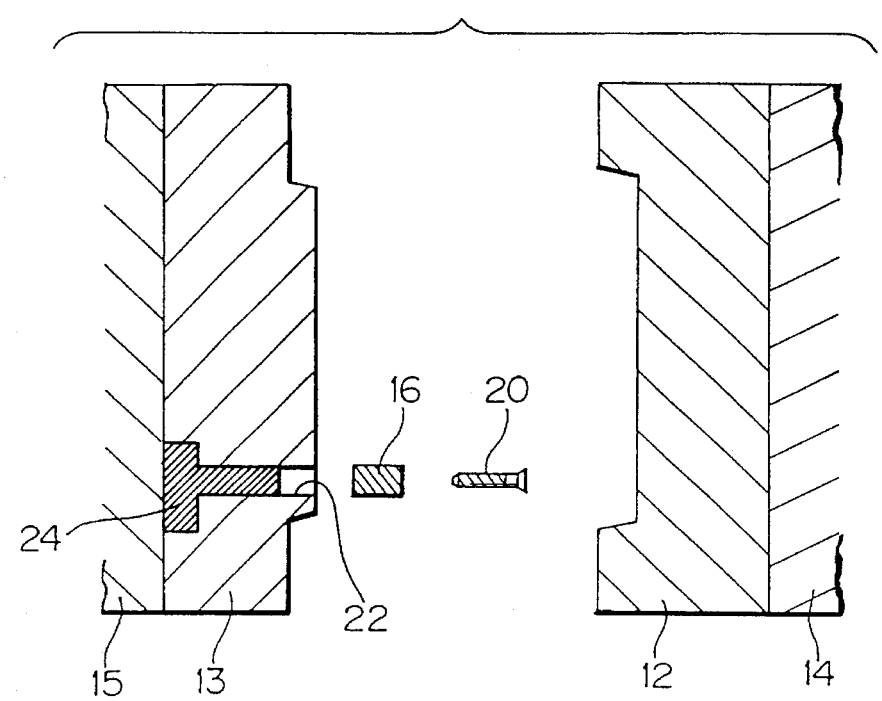
FIG. 9 An exploded view of the mold when the long bush pin is attached in the embodiment of FIG. 8.
Figure 10:
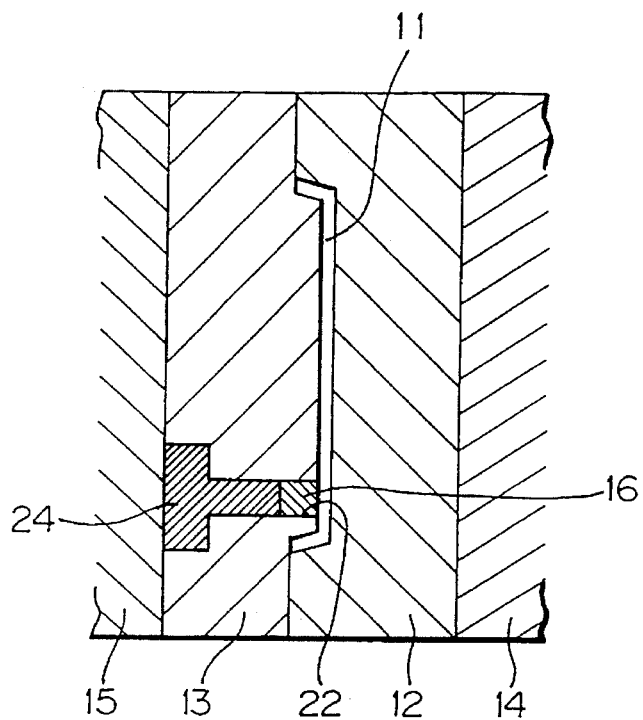
FIG. 10 A cross-sectional view of the mold in the state where the short bush pin is attached in another embodiment of the present invention.
Figure 11:
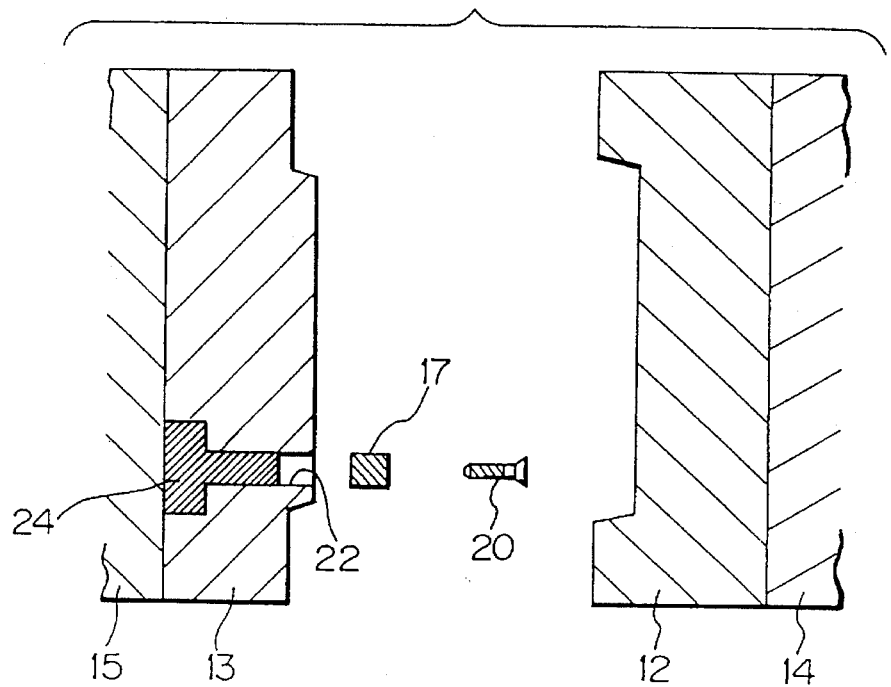
FIG. 11 An exploded view of the mold when the short bush pin is attached in the embodiment shown in FIG. 10.

FIG. 8 to FIG. 11 show another embodiment of the method and apparatus for molding the cases used in information detection hole systems according to the present invention. As with the foregoing embodiment, this embodiment also shows the example of molding microfloppy disk cases. FIG. 8 and FIG. 9 show the formation of a storage capacity identification hole 8 of a 2MB type case, while FIG. 10 and FIG. 11 show the formation of a 1MB type case. As with the foregoing embodiment, FIG. 8 and FIG. 9 show a cross-section of the mold similar to the cross-section along the line A—A in FIG. 6, while FIG. 10 and FIG. 11 show a cross-section of the mold similar to the cross-section along the line B—B in FIG. 5.

As with the foregoing embodiment, in the case molding method and apparatus of the present embodiment, a bush fitting hole 22, into which a bush pin 16 or 17 relating to the formation of the identification hole is removably fitted, is formed in the core mold 13. The major differences with the foregoing embodiment lie with the points that the bush fitting hole 22 is configured to pass through the core mold 13, and that an insertion body 24 is provided so as to fit into the bush fitting hole 22 from the side opposite to the cavity 11 side. The depth of penetration of the bush pin 16 or 17 in the bush fitting hole 22 can thus be regulated. Here, the insertion body 24 is attached to the core mold 13 from the side which is opposite to the cavity of the core mold 13, and is pressed inward by the movable side attachment plate 15 which closely adheres to the rear face of the core mold 13.

The long bush pin 16 which forms the storage capacity identification hole 8 by projecting at the prescribed length into the cavity 11, and the short bush pin 17 which fills the bush fitting hole 22 but does not project to the cavity 11 side are both fixed so that they do not fall out of the core mold 13 by screwing the fixing means 20 which passes through the center axis of these pins into the insertion body 24.

The configuration of the present embodiment is also able to obtain the same operational effects as the foregoing embodiment. Furthermore, the configuration is adopted where, in the mold 13 into which fits the bush pin 16 or 17, a bush fitting hole 22 into which enters the bush pin 16 or 17 is provided in such a way that it passes from the cavity 11 side to the side opposite to the cavity 11, and where an insertion body 24 is provided so as to enter into the bush fitting hole 22 from the side opposite to the cavity 11 to thereby regulate the depth of penetration of the bush pin 16 or 17 into the bush fitting hole 22. Accordingly, even if there is progressive abrasion of the bush pin 16 or 17 and of the insertion body 24 supporting the bush pin due to the repetition of the molding process, repair can be easily accomplished because it is possible to adjust the position of the bush pin 16 or 17 by replacing the insertion body 24. Furthermore, it becomes possible to effect a more accurate positioning of the bush pin 16 or 17 by adjusting or changing the extent of projection of the bush pin 16 or 17 by means of the insertion body 24, and it simultaneously becomes possible to make more multi-purpose use of the limited bush pin 16 or 17.

In each of the preceding embodiments, a configuration is adopted where the bush pin is attached to the core mold, but it is also acceptable to adopt a configuration where the bush pint is attached to the cavity mold. The design where the insertion body 24 is fixed to the mold, or the design of the insertion body 24 itself is not limited to the preceding embodiments.

The preceding embodiments show the example of molding microfloppy disk cases, but so long as it concerns cases used in information detection hole systems which obtain specified information from identification holes, the present invention can also be suitably applied to the molding of other appropriate cases.

In each of the preceding embodiments, the long bush pin 16 designed to form the identification hole is configured of contact the surface to the mold which lies opposite to its tip, but it is also acceptable to set the length of the bush pin 16 so that a slight clearance is produced to an extent not to cause burrs. If this is done, even if the material used for the bush pin 16 is just as hard as the mold, one can avoid damaging the molding surface of the mold.

According to the method and apparatus for molding the cases used in information detection hole systems of the present invention, if the cavity mold and core mold attached to the molding machine are opened, one can attach/remove the bush pin for forming an identification hole to/from the mold simply by manipulating the fixing means which can be manipulated from the parting face side between the cavity mold and core mold, and it becomes possible to replace the bush pin without conducting troublesome operations involving the removal of the mold, the assembly/disassembly of the mold, and its further attachment.

Accordingly, for example, when molding a plurality of different types of microfloppy disk cases having identification holes of differing positions, one need simply prepare in advance only the bush pin corresponding to each type, and conduct appropriate replacement and use of the bush pins alone. By unifying the types of molds to be prepared by making common use of one mold, one can mitigate equipment costs, and help reduce production costs.

Since the operations required to change the type of case to be molded involve only the replacement of the bush pin by manipulation of the fixing means from the parting face side of the mold, one can greatly reduce the work required to change the types, and simply improve the rate of operation.

Furthermore, since the fixing means which is designed to attach/remove the bush pin to/from the mold is a member which passes through the bush pin and screws into the mold, is positioned inside the cavity, and is positioned within the range of formation of the identification hole, there is no infliction of meaningless marks on the surface of the molded case which damage the external appearance.

There can be a configuration where, a bush fitting hole is provided so that it passes from the cavity side to the side opposite to the cavity, and where an insertion body is provided so as to enter into the bush fitting hole from the side opposite to the cavity to thereby regulate the depth of penetration of the bush pin into the bush fitting hole. In this case, even if there is progressive abrasion of the bush pin and of the insertion body supporting the bush pin due to repetitive molding processes, repair can easily accomplished because it is possible to adjust the position of the bush pin by replacing the insertion body. Furthermore, it becomes possible to effect a more accurate positioning of the bush pin by adjusting or changing the extent of projection of the bush pin by means of the insertion body, and it simultaneously becomes possible to make multi-purpose use of the limited bush pin.

Furthermore, since the bush pin which forms the identification hole is made from material which is softer than the mold body, even if molding is repeated, it is possible to prevent damage or abrasion of the mold of the counterpart side which is contacted by the bush pin. For example, if a configuration is adopted where a crimp is formed on the case surface molded by the mold, it is possible to prevent the abrasion of the crimp.

What is claimed is:

1. A method of molding a case used in an information detection hole system in which the presence of an identification hole formed in the case, the position of said identification hole, and the form of said identification hole are detectable for indicating specific information related to said case, said method comprising the steps of:

provid a removable bush pin which forms said identification hole by projecting said removable bush pin into a cavity of a mold which forms said case;

fixing said bush pin by providing a fixing member which passes through said bush pin, which inserts into said mold, and which can be manipulated from a surface of said mold which faces a cavity of said mold;

molding said case;

providing a bush fitting hole in the mold to which said bush pin is attached, into which said bush pin is inserted and which passes from said surface to the side opposite to the cavity; and inserting an insertion body into said bush fitting hole from a side opposite said surface, for regulating the depth of penetration of said bush pin into said bush fitting hole, wherein changing said specific information between molding operations is conducted by one of replacing said bush pin and altering its attachment position by manipulating said fixing member.

2. An apparatus for molding a case used in an information detection hole system in which the presence of an identification hole formed in the case, the position of said identification hole, and the form of said identification hole are detachable for indicating specific information relating to said case, said apparatus comprising:

a core mold, attached to one of a movable attachment place and a fixed attachment plate;

a cavity mold attached to the other of said movable attachment plate and said fixed attachment plate, said cavity mold being disposed facing said core mold, wherein said cavity mold and said core mold form a cavity in a closed-mold configuration;

a bush fitting hole disposed in a surface of one of said core mold and said cavity mold, wherein said bush fitting hole passes through an entire width of said one of said core mold and cavity mold;

a bush pin removably disposed in said bush fitting hole; and a fixing member passing through said bush pin for fixing said bush pin in said bush fitting hole; and an insertion body adjustably insertable into said bush fitting hole from a side opposite a side into which said bush pin is inserted for regulating the depth of penetration of said bush pin in said bush fitting hole.

3. A molding apparatus according to claim 2, wherein said bush pin is softer than said cavity mold and said core mold.

4. An apparatus for molding a case used in an information detection hole system in which the presence of an identification hole formed in the case, the position of said identification hole, and the form of said identification hole are detachable for indicating specific information relating to said case, said apparatus comprising:

a core mold, attached to one of a movable attachment place and a fixed attachment plate;

a cavity mold attached to the other of said movable attachment plate and said fixed attachment plate, said cavity mold being disposed facing said core mold, wherein said cavity mold and said core mold form a cavity in a closed-mold configuration;

a bush fitting hole disposed in a surface of one of said core mold and said cavity mold, wherein said bush fitting hole passes through an entire width of said one of said core mold and cavity mold;

a bush pin removably disposed in said bush fitting hole, wherein said bush pin is capable of projecting into said cavity; and a fixing member passing through said bush pin for fixing said bush pin in said bush fitting hole; and an insertion body adjustably insertable into said bush fitting hole from a side opposite a side into which said bush pin is inserted for regulating the depth of penetration of said bush pin in said bush fitting hole.

5. A molding apparatus according to claim 4, wherein said bush pin is softer than said cavity mold and said core mold.

6. An apparatus for molding a case used in an information detection hole system in which the presence of an identification hole formed in the case, the position of said identification hole, and the form of said identification hole are detachable for indicating specific information relating to said case, said apparatus comprising:

a core mold, attached to one of a movable attachment place and a fixed attachment plate;

a cavity mold attached to the other of said movable attachment plate and said fixed attachment plate, said cavity mold being disposed facing said core mold, wherein said cavity mold and said core mold form a cavity in a closed-mold configuration;

a bush fitting hole disposed in a surface of one of said core mold and said cavity mold, wherein said bush fitting hole passes through an entire width of said one of said core mold and cavity mold;

a bush pin removably disposed in said bush fitting hole, wherein said bush pin is capable of being flush with a top of said bush fitting hole, thereby not projecting into said cavity; and a fixing member passing through said bush pin for fixing said bush pin in said bush fitting hole; and an insertion body adjustably insertable into said bush fitting hole from a side opposite a side into which said bush pin is inserted for regulating the depth of penetration of said bush pin in said bush fitting hole.

7. A molding apparatus according to claim 6, wherein said bush pin is softer than said cavity mold and said core mold.

* * * * *